United States Patent [19]

Higgins

[11] 4,354,524

[45] Oct. 19, 1982

[54] AUTOMATIC RESET PNEUMATIC TIMER

[75] Inventor: Robert S. Higgins, Tulsa, Okla.

[73] Assignee: Otis Engineering Corporation, Dallas, Tex.

[21] Appl. No.: 186,914

[22] Filed: Sep. 15, 1980

[51] Int. Cl.³ .............................................. F16K 31/126

[52] U.S. Cl. .......................... 137/624.14; 137/624.13; 137/624.18

[58] Field of Search ................ 137/624.14, 102, 624.2, 137/624.18, 624.13, 624.15

[56] References Cited

U.S. PATENT DOCUMENTS 3,152,611 10/1964 Hubby ............................ 137/624.14

3,384,105 5/1968 Leggett ........................ 137/624.14 X 3,722,851 3/1973 Love ............................ 137/624.14 X 3,942,518 3/1976 Tenteris ....................... 137/624.14 X

*Primary Examiner*—Alan Cohan

*Attorney, Agent, or Firm*—H. Mathews Garland

[57] ABSTRACT

An automatic reset pneumatic timer for control of a motor valve on a lift gas injection system of an oil and gas well or a plunger-pump well installation in an oil or gas well. The pneumatic timer includes means for connecting the timer with a source of air or gas pressure, means for connecting the timer with the operator of a motor valve, a cycle timer including a pneumatic valve, an on timer including a pneumatic valve, a pneumatic relay valve connected between the on timer and the motor valve for directing a pressure signal to the motor valve when the on timer is operating, and a pneumatic automatic reset valve connected with the source and the cycle timer and on timer for resetting both timers to initiate a new sequence of operation when the prior sequence is completed. One form of the pneumatic timer operates solely in response to the cycle timer and on timer of the system. Another form of the pneumatic timer includes a trip valve and a shut-off-on-arrival valve for operating the pneumatic timer in response to movement of a plunger in a tubing string of a well. Both forms of the timer pneumatically control the length of time a motor valve is held open and the time period between each operation of the motor valve.

20 Claims, 9 Drawing Figures

AUTOMATIC RESET PNEUMATIC TIMER

This invention relates to pneumatic timers and more particularly relates to automatic reset pneumatic timers especially adapted for the control of valves in oil and gas well producing systems.

Oil wells in formations in which the formation pressure is substantially depleted are frequently produced by secondary recovery methods including gas lift in which gas is introduced into a column of liquid in the well to assist in raising the liquids to the surface. Such gas is often injected intermittently requiring a control of the length of each injection period and the time spacing between injection periods. Preferably such intermittent gas lift injection is controlled automatically. In other types of oil and gas wells a plunger-pump system is often used for displacing oil and/or water to the surface periodically also preferably controlled automatically. Such plunger-pump systems are used in low-pressure gas wells, for unloading gas wells, in wells with low-oil pressure and high-gas pressure, in wells with high oil to water ratio, for unloading fluids in high-pressure and high-volume gas wells, in gas wells on casing flow, and in paraffin cutting in wells. The available automatic controllers for both of these types of wells have been largely mechanical, are relatively expensive both initially and to maintain, and are difficult to precisely set. For example, one such mechanical timer runs off of a spring loaded diaphragm which works through a series of gears and clutches rotating a shaft which goes through a gear box to rotate a timing wheel on which pins or lugs are mounted for actuating a pilot valve which in turn controls a motor valve in timed sequence for controlling well flow or injection gas flow.

A typical control system using mechanical features including the timing wheel is shown in U.S. Pat. No. 3,351,021 issued Nov. 7, 1967.

It is therefore a principal object of the invention to provide a new and improved automatic pneumatic control system useful for such functions as controlling flow valves.

It is another object of the invention to provide an automatic pneumatic timer which does not include the mechanical features found in previously available control systems for performing such functions as opening and closing flow control valves.

It is another object of the invention to provide an automatic reset pneumatic timer which may be constructed at a lower cost than previously available timers.

It is another object of the invention to provide an automatic reset pneumatic timer which is less expensive to maintain than previously available timers for operating flow control valves.

In accordance with the present invention there is provided an automatic reset pneumatic timer for providing a control fluid pressure at predetermined intervals for predetermined periods of time including a relay valve for supplying control pressure to a motor valve, a first time controlled valve for supplying control pressure to the relay valve for a predetermined length of time, a second time controlled valve for operating the first time controlled valve at predetermined intervals, and an automatic reset valve for operating both the first and second time control valves. The automatic reset valve initiates operation of the first and second time control valves simultaneously with the first time controlled valve supplying pressure to the motor valve through the relay valve for a predetermined length of time and the second time control valve controling the automatic reset valve for resetting and initiating operation of both the first and second time control valves at selected predetermined intervals.

The objects and advantages of the present invention will be apparent from the following detailed description of preferred embodiments of the invention in conjunction with the accompanying drawings wherein.

Figure 1:
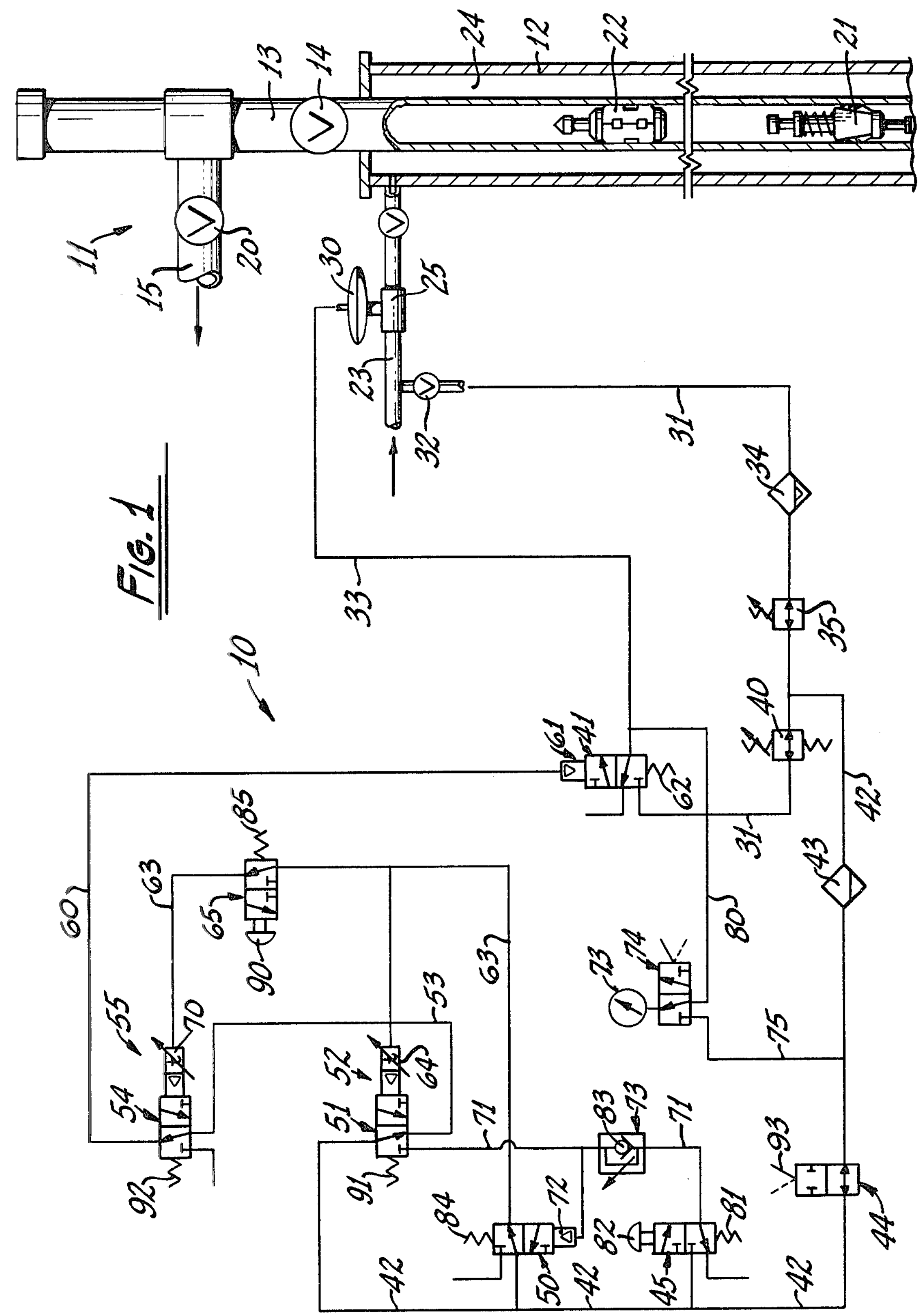
FIG. 1 is a schematic diagram of an automatic reset pneumatic timer employed in a well system for controlling lift gas and utilizing a plunger-pump.

Referring to FIG. 1 of the drawings, an automatic reset pneumatic timer 10 is connected with a well system 11 equipped for gas lift for intermittently supplying lift gas to the well system to assist in producing well fluids. The well system includes a casing 12, a production tubing string 13 including a valve 14, and a flow line 15 having a valve 20. The well system also includes a plunger-pump installation having a bumper spring assembly 21 and a plunger 22 which is displaced upwardly from the bumper spring by gas within the tubing string to lift well fluids such as oil and water in the tubing string discharging the fluids through the flow line 15. The well system 11 is a typical standard installation used in situations where either oil or water or oil and water are displaced from a well by either gas in the formation or gas injected into the well through the annular space between the casing and the tubing string. A plunger-pump installation of the type illustrated is shown and described in Otis Engineering Corporation Catalog No. OEC5122 entitled GAS LIFT EQUIPMENT AND SERVICES published in November 1976. A similar plunger-pump well installation is also illustrated in U.S. Pat. No. 3,351,021 issued Nov. 7, 1967. In the well installation illustrated in FIG. 1 formation gas pressure is supplemented by lift gas injected through a flow line 23 connected into the casing 12 to supply lift gas into the annulus 24 defined between the casing and the tubing string 13. A motor valve 25 having a diaphragm type operator 30 is connected in the gas lift line 23 for automatic intermittent control of the flow of lift gas by the pneumatic timer 10. The motor valve 25 with the operator 30 is a standard motor valve assembly as illustrated and described at page 37 of the Otis Engineering catalog, supra. The particular motor valve employed in the well system 11 is a normally closed valve which is intermittently opened by the timer 10. Depending upon the history of the particular well in which the well system 11 is installed, the controller 10 is adjusted to periodically open the motor valve for a given period of time to inject the lift gas. It will be apparent that in the particular well system shown the injection period and the cycle time, that is the time between injection periods, are affected by the length of time required for the plunger 22 to move from the bumper spring 21 to the wellhead and drop back down the well to the bumper spring. The injection period should be no longer than the time required for the plunger to move up the well and the time between injections should be no less than the time required for a complete round trip of the plunger. Of course, the controller 10 may also be installed on a gas lift flow line 23 leading into a well system utilizing gas lift valves of standard design rather than the plunger-pump system as also illustrated and described in the Otis Engineering catalog, supra. Well operating conditions, of course, in such an installation determine the frequency and the length of the periods during which injection gas is introduced into the well.

As illustrated in FIG. 1, the pneumatic timer 10 is supplied with operating gas through a line 31 including a valve 32 connected into the gas lift line 23 upstream from the motor valve 25 so that the timer receives a constant supply of operating gas pressure whether the motor valve is open or closed. The lift gas in the line 23 is provided from a source of gas under pressure, not shown. The controller 10 operates the motor valve by controlled gas pressure in a line 33 connecting the diaphragm operator 30 of the motor valve with the timer. The timer gas supply line 31 is connected through a filter 34, a high pressure regulator 35, a low pressure regulator 40, and into an output relay valve 41. The supply gas in the line 31, which typically may range in pressure from 100 to 3000 psi is reduced in pressure by the regulator 35 to approximately 85 psi which is the operating pressure for the pneumatic timer 10. The regulator 40 further reduces the pressure to a range of 25 to 30 psi for supply through the relay valve 41 to the motor valve operator 30. A timer supply line 42 is connected into the line 31 between the regulators 35 and 40 to provide the timer with the operating gas at 85 psi. The line 42 connects through a filter 43, an on-off valve 44, to supply ports on each of a cycle reset valve 45, an automatic reset valve 50, and a valve 51 in a cycle timer 52. An output line 53 is connected from the cycle timer valve 51 into a valve 54 in an on timer 55. An output line 60 is connected from the valve 54 into an operating chamber 61 of the relay valve 41 for supplying an operating pressure to the valve 41 to shift the valve against the spring 62 of the valve to move valve from the exhaust position shown to an on position to supply gas through the line 33 to the motor valve operator 30. An output line 63 is connected from the automatic reset valve 50 into an operating chamber 64 of the cycle timer 52 and through an on timer reset valve 65 into an operating chamber 70 of the on timer 55. A discharge line 71 is connected from the valve 51 of the cycle timer 52 into an operating chamber 72 of the automatic reset valve 50 and through a flow control valve 73 into the cycle reset valve 45. A pressure gauge 73 is connected with a selector valve 74 which is connected by a line 75 into the line 42 and a line 80 into the line 33 to selectively indicate on the gauge the operating pressure of the timer in the line 42 and the operating pressure communicated by the timer through the line 33 to the motor valve.

Each of the valves in the timer are standard spool type pneumatic valves. The cycle reset valve 45 is a manual type valve biased by a spring 81 to a position connecting the line 71 to exhaust and movable against the spring by a manual push button 82 to a position connecting the supply line 42 into the line 71. The valve 73 includes a check valve 83 to prevent backflow through the line 71 into the valve 45 and an adjustable bypass to bleed off pressure in the line 71 for controlling the length of time gas flow is interrupted to the timers during reset. The automatic reset valve 50 has a spring 84 biasing the valve to the open position connecting the supply line 42 with the line 63 leading to the timers. Pressure into the valve operator 72 of the valve 50 shifts the valve against the spring 84 to connect the line 63 with the exhaust port of the valve 50. Both of the timers 52 and 55 are standard pneumatic timers having constant speed air or gas driven motors in combination with suitable gearing and operating a three-way spool valve. Such timers are available from H. Kuhnke Inc., 1 East Highland Avenue, Atlantic Highlands, N.J. 07716 identified as 54 Series Timers With Spool Valve. Such timers are also available in various timing ranges from the Aro Corporation, One Aro Center, Bryan, Ohio 43506. For example, Aro Model No. 59832-10 has a timing range of 0.3–10 seconds. Aro Model No. 59834-100 has a timing range of 3–100 hours. The timer 52 is selected with a suitable timing to establish the time intervals between lift gas injections. The timer 55 is selected to establish the length of time lift gas is injected each cycle. A typical example for gas injection would utilize timers permitting fifteen to twenty minutes between cycles with each on time being five minutes. Thus the cycle timer 52 in order to achieve such typical operating time must be capable of running at least in excess of twenty minutes while the on timer 55 must be capable of running no less than five minutes. The on timer reset valve 65 is biased to an open position by spring 85 allowing gas to flow through the line 63 to the on timer 55 and includes a hand operated push button 90 for shifting the valve to an exhaust position for interrupting the flow to the on timer and exhausting the pressure from the timer operator 70. The connections into the timers 52 and 55 from the line 63 for operating the timers may be referred to as the timing ports. Each of the timers includes a biasing spring for resetting the timer upon interruption of pressure into the timing ports. The timer 52 has a reset spring 91 while similarly the timer 55 has a reset spring 92.

Figure 5:
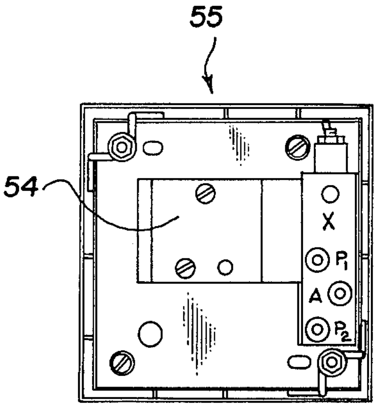
FIG. 5 is a back view in elevation of the timer of FIG. 4.
Figure 6:
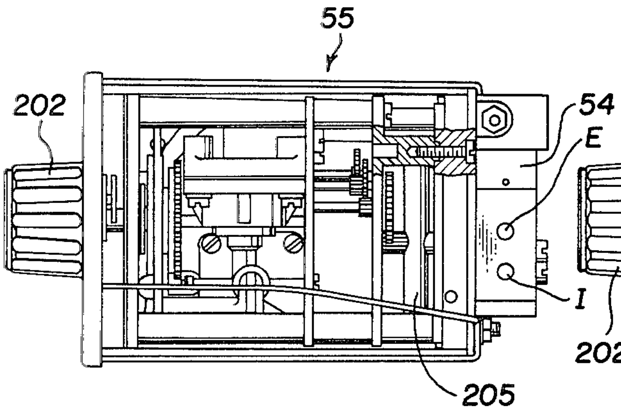
FIG. 6 is a top plan view of the timer of FIG. 4.
Figure 7:
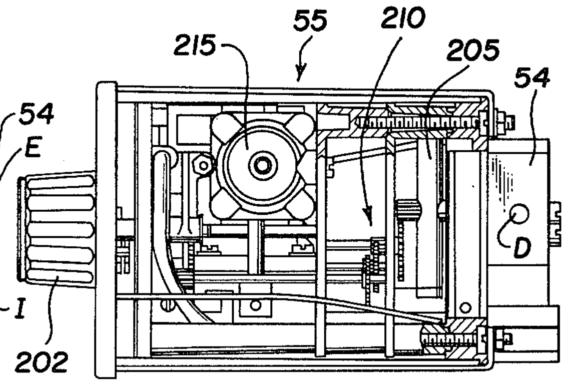
FIG. 7 is a bottom view of the timer of FIG. 4.
Figure 8:
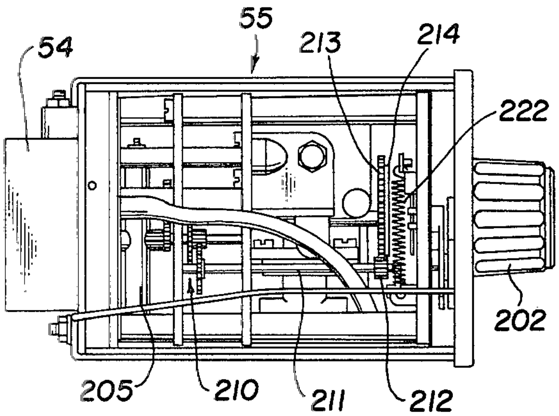
FIG. 8 is a left side view in elevation of the timer of FIG. 4.
Figure 9:
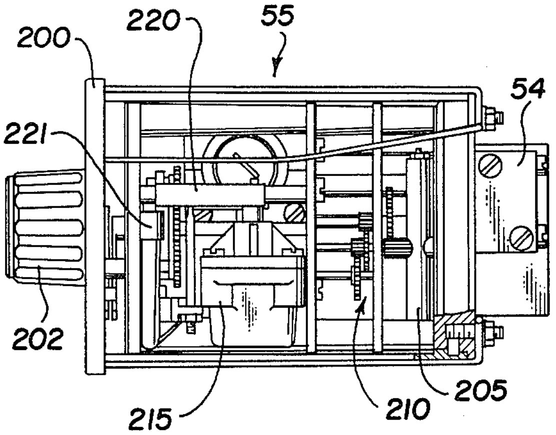
FIG. 9 is a right side view in elevation of the timer of FIG. 4.

FIGS. 4–9 inclusive illustrate the structure of a previously identified 54 Series Timer manufactured by H. Kuhnke, Inc. Referring to FIGS. 4–9 inclusive, the timer 55 has a case 200 provided with a front dial 201 marked with one minute timing increments showing the timing range of the timer. A control knob 202 is mounted on the dial for controlling the movement of a first pointer 203 and a second pointer 204. Rotational of the knob 202 moves both of the pointers to the marking indicating the time range over which it is desired that the timer function. The pointer 203 then remains fixed at that time range while the pointer 204 moves during the operation of the timer from the quantity at which the pointer 203 is set back to zero. So long as the knob 202 remains at a fixed position, the pointer 203 points to the time range over which the timer is to operate. Upon reset the movable pointer 204 returns from the zero setting back to the position of the first pointer 203 for the next timing cycle. As shown in FIG. 5 mounted on the back of the housing 200 is the 3-way valve 54 which is controlled by the operation of the timer. In the particular form of the timer illustrated the port marked X is used as the input signal control for the timer. The other ports marked P1, A, and P2 are plugged and thus are not used in this particular application of the timer. As shown in FIG. 6 the valve 54 has an input port I which in the system of FIG. 1 is connected with the line 53 and an exhaust port E which forms the exhaust of the valve for exhausting pressure from the line 60. As shown in FIG. 7 the valve 54 has a port D which is the discharge signal port connected with the line 60 in the system of FIG. 1. The timer control of the valve 54 thus communicates the inlet port I with the discharge port D at one position of the valve and at the other position of the valve communicates the port D with the port E for exhaust through the valve from the line 60. The timer is driven by an air motor 205 coupled with a gear train or transmission 210 which drives a shaft 211 having a pinion gear 212 arranged to engage and disengage a ring gear 213 which is secured with and turns a circular cam 214 arranged to be selectively positioned with pointer 204 for setting the timer for the desired delay time. A cylinder and piston assembly 215 is coupled with a linkage assembly 220 which operates with the pinion gear 212 to engage and disengage the pinion gear and with the cam 214 for starting and stopping the timer. The assembly 220 also functions with a bleed valve 221 which directs air pressure into the 3-way valve 54 when closed for moving the 3-way valve to one position and when open bleeds off pressure to the 3-way valve allowing the spring 92 of the 3-way valve to shift the position of the valve. The air circuitry of the timer interconnects the 3-way valve and the bleed valve 221 as well as the cylinder assembly 215 which is operated by the air pressure in one direction and returned in the opposite direction by a spring. A tension spring 222 functions in the linkage assembly for disengaging the pinion gear 212 from the ring gear 213. When an input air signal is applied to the port X through the line 63, the air signal passes through the air circuitry of the timer to the bleed valve 221 through which it flows into the open. The air signal also flows through the circuitry of the timer to the cylinder assembly 215 and into the air motor 205 starting the motor and turning the pinion gear 212. The air into the cylinder assembly 215 operates the cylinder assembly to move the linkage 220 which is shifted against the spring 222 engaging the pinion gear 212 with the ring gear 213 thereby turning the cam 214 attached to the ring gear. The rotation of the cam moves the pointer 204 on the timer dial from the preset position toward the zero position. When the cam is rotated sufficiently for the pointer 204 to time out at zero, a cam lever engages the cam closing the bleed valve 221 which directs the input air signal into the 3-way valve 54 causing the valve to shift to the exhaust position at which the port E exhausts air in the line 60 to the atmosphere. Simultaneously, the spring 222 operates the linkage assembly disengaging the pinion 212 from the gear 213 so that the air motor 205 ceases driving the cam 214. At this time the motor 205 continues to operate though it is disengaged from and is not driving the gear 213 and the cam 214. When the input signal through the line 63 is interrupted by operation of the automatic reset valve 50, an interruption of 200 milliseconds is required for reset of the timer. The interruption of the signal through the line 63 timer stops the motor 28 and stops the supply of air into the cylinder unit 215. The spring, now shown, in the cylinder unit 215 operates the piston rod of the unit shifting the linkage assembly 220 which reopens the bleed valve 221 and returns the dial pointer 204 counterclockwise to the preset position of the dial counter 203. The open bleed valve 221 bleeds off the air signal to the 3-way valve so that the spring 92 on the 3-way valve returns the valve to the start position at which a signal is again supplied into the line 60. An air signal from the port X is also supplied back into the cylinder assembly 215 actuating the cylinder assembly which operates the linkage 220 to reengage the pinion gear 212 with the ring gear 213 starting the cycle of operation of the timer again causing it to operate for the period of time at which it has been previously set. The timer 52 is identical to the timer 55 except that the timing range of the timer 52 is longer to control the cycles of operation of the timer 55. Such timers are still further illustrated and described in drawings dated Sept. 6, 1978 available from H. Kuhnke, Inc. and in a catalog of H. Kuhnke, Inc. dated Mar. 2, 1978 entitled Miniature Pneumatic System Components, at pages 31 and 32.

In operating the pneumatic timer 10 to control the injection of lift gas into the well system 11, the line 23 is connected with a source of lift gas, not shown. The motor valve 25 is normally closed when no pressure is applied through the line 33 into the valve operator 30. The valve 32 is open supplying gas under pressure into the line 31 leading to the timer 10. The gas flows through the filter 34 and the regulator 35 which reduces the pressure of the gas to approximately 85 psi. The gas at 85 psi passes into the line 42 through the filter 43 to the on-off valve 44. The gas at 85 psi also passes to the regulator 40 which reduces the pressure to the range of 25–30 psi as it flows to the relay valve 41. The relay valve 41 is represented in FIG. 1 as closed with the valve connecting the line 33 from the motor valve to the exhaust of the valve 41 so that the motor valve remains closed. Thus, the pressure in line 31 to the relay valve 41 is not at this instant communicated into the line 33 to the motor valve. When the on-off valve 44 is turned to the open or on position by the lever 93 on the valve the operating gas pressure is communicated through the line 42 to the automatic reset valve 50 which at the normal open position shown communicates the gas pressure through the line 63 into both the cycle timer 52 and the on timer 55 through the timing ports and the timer operators 64 and 70. The spool valves 51 and 54 on the cycle timer and the on timer, respectively, are positioned to communicate the operating gas pressure from the line 42 through the cycle timer to the on timer and from the on timer through the line 60 to the pilot port of the relay valve 41 shifting the relay valve from the exhaust position shown to the open position communicating the line 31 through the relay valve with the line 33 supplying the lower 25–30 psi pressure into the motor valve operator 30 to open the motor valve so that the lift gas in the line 23 flows into the annulus 24 of the well system 11. With the various valves of the timer in the normal positions the manual cycle reset valve 45 is closed so that no pressure is communicated from the line 42 through the valve 45 and the valve 45 connects the line 71 to exhaust. The on timer reset valve 65 is at the normal open position biased by the spring 85 communicating the timer operating gas pressure to the timer 55. Assuming that the on timer is set for five minutes and the cycle timer is set at twenty minutes, at the end of five minutes the on timer 55 shifts the valve 54 to the exhaust position exhausting the operating gas pressure in the line 60 leading to the relay valve 41. The spring 62 of the relay valve shifts the valve back to the position illustrated in FIG. 1 at which the relay valve exhausts the line 33 allowing the operating gas to flow from the motor valve operator 30 so that the normally closed motor valve 25 shifts to the closed position. At this time there is continued operating gas pressure in the timer through the line 63 to both the cycle timer 52 and the on timer 55. In another fifteen minutes when the cycle timer times out the valve 51 is shifted so that the supply gas from the line 42 is effectively disconnected from the line 53 to the on timer and connected with the line 71 leading to the automatic reset valve operator 72 and to the flow control valve 73. The automatic reset valve 50 is shifted from the position shown to an exhaust position connecting the line 63 through the automatic reset valve to exhaust so that the operating gas pressure through the line 63 to both of the timer 52 and 55 is interrupted. A gas interruption to the timers of as little 200 milliseconds permits the timers to reset shifting the valves 51 and 54 of the cycle timer and the on timer, respectively, back to the position shown in FIG. 1. The pressure in the line 71 leading to the automatic reset valve 50 bleeds down through the flow control valve 73 passing to the exhaust of the cycle reset valve 45 allowing the spring 84 to shift the automatic reset valve 50 back to the position illustrated in FIG. 1 reconnecting the supply of gas from the line 42 into the line 63 leading to the timing ports on both the cycle timer and the on timer so that both timers after reset are restarted. During the brief interruption of supply gas to the timing ports of the timers, each of the timers reset shifting the spool valves of the timers back to the position illustrated in FIG. 1 recommunicating the line 42 through the cycle timer to the line 53 and through the on timer into the line 60 for reopening the relay valve 41 connecting the line 31 back into the line 33 to reopen the motor valve 25 starting another five minute period of gas injection. At the end of five minutes the on timer will again shut off flow to the relay valve allowing the motor valve to close while the cycle timer will continue operating for an additional fifteen minutes until the sequence is again repeated.

At any time during the operation of the pneumatic timer 10 the complete cycle may be manually restarted by pressing the button 82 on the cycle reset valve 45. Depressing the button 82 opens the valve 45 connecting the line 42 into the line 71 so that supply gas flows through the flow control valve 73 including the check valve 83 to the pilot port in the operator 72 of the automatic reset valve 50 closing the output from the automatic reset valve into the line 63. The gas flow to both of the timers in the line 63 is interrupted thereby causing the timers to both reset starting the cycle timer and the on timer so that the motor valve is opened and a complete cycle begins. Thus, the manual cycle reset valve 45 manually accomplishes the same function as the automatic reset valve 50. If it is not desired to restart the complete cycle but rather to reopen the motor valve without interfering with the normal sequence, the on timer only may be recycled by means of the manual on timer reset valve 65. The button 90 is pressed interrupting the flow of gas in the line 63 to the timing port in the on timer operator 70 causing the on timer to reset thus closing and reopening the motor valve.

Figures 2, 3:
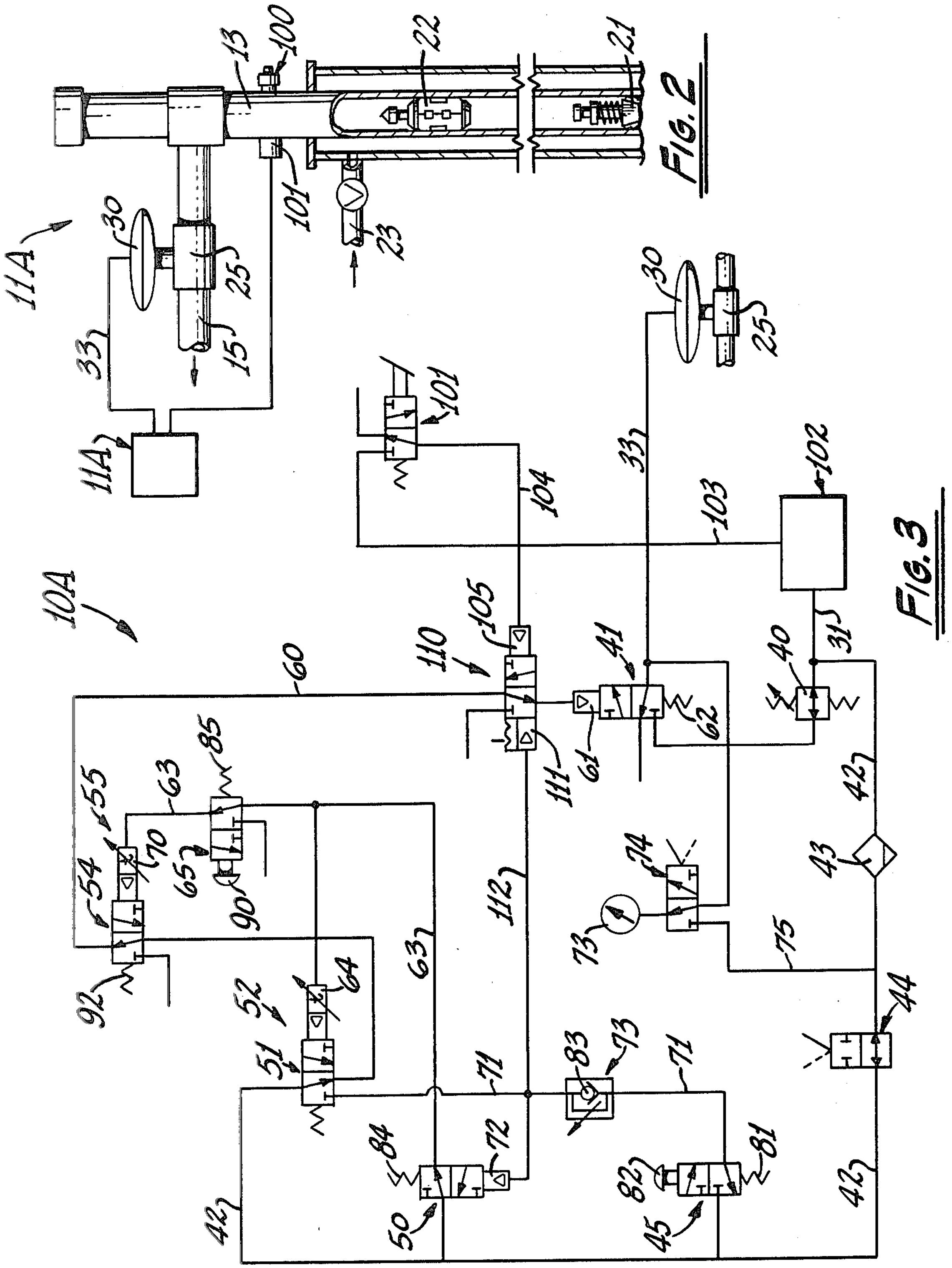
FIG. 2 is a schematic diagram of a plunger-pump well system showing an automatic reset pneumatic timer in accordance with the invention connected with a motor valve in the flow line from the well.
FIG. 3 is a schematic diagram of the automatic reset pneumatic timer shown in the well system of FIG. 2.
Figure 4:
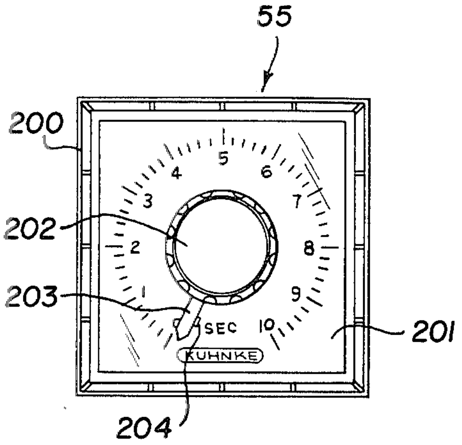
FIG. 4 is a front view in elevation of one of the standard pneumatic timers employed in the invention.

Referring to FIG. 3, another automatic reset pneumatic timer 10A embodying the features of the invention is connected with a well system 11A for controlling well production responsive to the movement of the plunger 22. In the timer 10A and the well system 11A of FIG. 3 substantially all of the structure of the well system and components of the timer are identical to those of the timer and well system illustrated in FIGS. 1 and 2. Such well system structure and timer components are therefore identified by the same reference numerals as used in FIGS. 1 and 2. In the well system 11A the motor valve 25 is secured in the flow line 15 to control the production of well fluids in the flow line. A catcher assembly 100 with a trip valve 101 is connected in the tubing string 13 for operating the timer in response to the arrival of the plunger 22 in the wellhead so that the timer will effect the closing of the motor valve allowing pressure equalization across the plunger permitting the plunger to drop back to the bumper 21 in the tubing string. The catcher assembly 100 is illustrated and described in the Otis Engineering Corporation Catalog OEC5122, supra. A suitable source of gas or air pressure 102 at approximately 85 psi is connected with the supply line 31 to the timer 10A and also is connected by a line 103 leading to an inlet port of the trip valve 101. An outlet port of the trip valve is connected by a line 104 to the pilot port of a valve operator 105 on a shut-off-on-arrival valve 110. The valve 110 is connected in the line 60 between the on timer 55 and the relay valve 41 for controlling the relay valve responsive to the operation of the trip valve by the plunger. The valve 110 has a pilot port in a valve operator 111 on the end of the valve opposite the operator 105 connected by a line 112 into the line 71 so that when the automatic reset valve is operated for resetting the timers, the valve 110 is reset at a position to operate the relay valve 41 to reopen the motor valve 25.

The cycle timer and the on timer of the timer 10A are selected and adjusted to provide for opening and closing the motor valve 25 for periods of time and at such intervals as are consistent with the production characteristics of the well in which the system 11A is installed. For example, the motor valve should be open during the time required for the plunger 22 to move from the bottom of the well to the catcher assembly 100 at which time the motor valve must close to stop flow from the well allowing pressure equalization across the plunger so that the plunger drops back down to the bumper 21 at the bottom of the well. The interval between the time the motor valve initially opens and the time that the motor valve next again opens is the total time required for the plunger to rise from the bumper 21 to the catcher assembly 100 plus the time required for the plunger to drop back down to the bumper together with the time required for sufficient pressure to again build in the well to lift the plunger back to the wellhead. As a general rule a plunger will fall in a clean gas well at approximately 2200 feet per minute. In oil the plunger will fall approximately 200 to 600 feet per minute. Of course, the time required for the well to recover sufficient pressure to again lift the plunger and the rate at which the plunger is lifted, depends upon a number of variables which will differ in each well and can only be determined from the history of a well.

Operation of the timer 10A is initiated in the same manner as previously described for the timer 10. The normal settings of the various valves permit a gas pressure signal to be transmitted through the cycle timer and the on timer to the line 60 leading through the valve 110 to the relay valve 41 for opening the motor valve 25 when the cycle timer and the on timer begin counting. The arrival valve 110 includes reset means in the valve operator portion 111 opening the valve upon reset of the timers so that the pressure signal from the line 60 passes through the valve 110 to the relay valve 41. With the timers running and the motor valve open, gas pressure in the well lifts the plunger 22 producing fluids in the tubing string 13 above the plunger from the wellhead through the flow line 15. When the plunger reaches the catcher assembly 100 the trip valve 101 is shifted from the position shown in FIG. 1 to its second position communicating the pressure source 102 through the line 103 into the line 104 leading to the valve 110. The pressure signal at the pilot port in the valve operator 105 shifts the valve 110 to the exhaust position thereby disconnecting the line 60 from the relay valve and communicating the relay valve to exhaust through the valve 110 so that the pressure in the motor valve operator 30 is bled off through the line 33 and the relay valve 41. With the motor valve 25 closed the pressure differential across the piston 22 equalizes permitting the piston to drop back downwardly to the bumper 21. Even if the on timer 54 has not timed out, the trip valve 101 overrides the timer by causing the shift of the valve 110 thereby bleeding off the pressure to the motor valve operator even though the on timer continues to time. If the on timer times out before the arrival of the piston 22 at the catcher assembly 100, the on timer shifts the valve 54 to the exhaust position thereby exhausting the gas pressure from the motor valve operator through the line 33. The line 60 bleeds down through the valve 54 allowing the relay valve 41 to close exhausting the motor valve line 33. Of course when the motor valve closes the pressure will equalize across the plunger 22 which will drop to the bottom of the well even though it may not have arrived at the catcher assembly 100. Of course, if the on timer times out without the plunger reaching the upper end of the stroke, the trip valve 101 remains in the position shown in FIG. 3 so that the valve 110 remains as shown communicating the line 60 through the valve 110 to the relay valve 41 allowing the timing out of the on timer to bleed off the pressure in the motor valve operator 30.

If the motor valve is closed responsive to the arrival of the piston 22 at the catcher assembly 100, when the piston drops back downwardly the trip valve 101 is returned back to the exhaust position of FIG. 3 at which any pressure within the operator 105 of the valve 110 is bled off through the valve 101. The valve 110 remains in the exhaust position due to the detent in the valve operator 111 which releasably locks the valve either open as shown or closed to exhaust the pressure to the valve 41 in the line 60. When the cycle timer 52 times out, the valve 51 of the timer is shifted as previously described to communicate a pressure signal from the line 42 through the valve 51 into the line 71 which is applied to the pilot port of the automatic reset valve 50 and to the pilot port in the valve operator 111 of the valve 110 simultaneously causing the reset of the timers of the valve 110 so that when the next sequence of operation begins the pressure signal from the on timer 54 through the line 60 is communicated to the relay valve 41 for opening the relay valve to the line 33 to apply the pressure signal to the motor valve operator 30 to open the motor valve 25. Thus, the timer 10A is operable in response to the arrival of the piston 22 at the catcher 100 and the timing out of the timers 52 and 54. Further, both timers may be reset with the manual valve 45, or the on timer only may be reset with the manual valve 65. It will be recognized that when the manual reset valve 45 is operated, the pressure signal from the line 42 which shifts the automatic reset valve 50 to reset the timer also applies a pressure signal to the pilot port in the operator 111 of the valve 110 to reset the valve 110 to communicate the line 60 to the relay valve 41 when the on timer again begins counting. The pressure in the line 71 applied from the line 42 to the manual valve 45 is also applied into the line 112 leading to the pilot port of the valve 110 for reset of the valve 110.

At any time during the operation of either of the timers 10 or 10A it is desired to remove the operating pressure from the timers, the on-off switch 44 is operated by the lever 93 to shut off flow from the gas source to the timer. Also at any time in either of the timers it is desired to read the pressure of the supply gas to the timer or the pressure of the gas to the motor valve, the lever on the selector valve 74 is operated to selectively communicate the pressure gauge 73 with the desired portion of the system.

The complete combination of components including all of the pneumatic valves, the cycle timer, the on timer, and the pressure gauge may be mounted within a very compact box or housing with the timer controls, pressure gauge, and on-off switch accessible in a front panel of the housing. In the timer 10 only the supply line 31 for connection with a source of gas pressure and the line 33 for connection with the motor valve operator 30 are required to be connected between the well system 11 and the timer 10. Similarly with the timer 10A the lines 31 and 33 are connected respectively with the source of gas pressure and the motor valve while one additional line 104 is connected with the trip valve of the well system 11A.

It will now be seen that a new and improved automatic reset pneumatic timer has been described and illustrated. The timer is a compact, inexpensive, fully pneumatic system requiring no source of outside power other than gas or air under pressure. The timers are therefore completely safe in that no electrical power is required which might produce a spark creating a fire hazard. The use of mechanical timing wheels such as twenty-four hour wheels and twelve hour wheels employed in prior art timers is eliminated. Thus, cycle timing and on timing may each be adjusted to any desired length within the capabilities of the timers and are therefore not required to be multiples or fractions of a given rotational period as required with mechanical timing wheels. The timers are readily adapted to intermittent injection of lift gas and to timed control of plunger-pump well installations used particularly in gas wells for oil and water removal.

It will be recognized that while the timers 10 and 10A have been described in terms of operating a normally closed motor valve 25, a normally open valve may be held closed and allowed to open in the desired time sequence by reversing the connection to the on timer so that the supply line 53 from the cycle timer to the on timer connects with the exhaust port of the on timer valve 54 as shown in FIG. 1. Such a reversal of the on timer connections allows the on timer valve to be connected to exhaust when the on timer is counting and communicates the pressure through the line 60 to hold the motor valve closed when the on timer is not timing.

What is claimed is:

1. An automatic reset pneumatic timer for delivering pressure signals to a motor valve to control the opening and closing of said motor valve comprising: a pressure source line; a pressure signal delivery line; a cycle timer having a pneumatic valve connected with said source line for controlling the time delay period between said pressure signal delivered by said pneumatic timer; an on timer having a pneumatic valve connected with said cycle timer for controlling the length of each of said pressure signals; said timers each having starting means and means for moving said pneumatic valve connected thereto to a first pressure signal discharge position responsive to initiating a pressure supply to said timer, means for moving said pneumatic valve to a second position closing said pressure signal exhaust responsive to timing out, and means for reset responsive to interrupting said pressure supply to said timer; an automatic reset valve connected between said source line and said cycle timer and said on timer for interrupting pressure to said timers for resetting said timers when said cycle timer times out; and a relay valve connected between said source line and said signal delivery line and with said on timer for delivering said pressure signals to said signal delivery line responsive to said on timer.

2. An automatic reset pneumatic timer in accordance with claim 1 including a first manual reset valve connected with said automatic reset valve to manually reset said cycle timer and said on timer.

3. An automatic reset pneumatic timer in accordance with claim 2 including a second manual reset valve connected with said on timer to manually reset said on timer.

4. An automatic reset pneumatic timer in accordance with claim 1 including a shut-off-on-arrival valve connected between said on timer and said relay valve for interrupting a pressure signal from said on timer to said relay valve to operate said relay valve in response to a pressure signal delivered to said shut-off-on-arrival valve.

5. An automatic reset pneumatic timer in accordance with claim 4 including a trip valve connected between said pressure source line and said shut-off-on-arrival valve to deliver a pressure signal to said shut-off-on-arrival valve responsive to a mechanical signal applied to said trip valve.

6. An automatic reset pneumatic timer in accordance with claim 5 including a first manual cycle reset valve connected with said automatic reset valve for manually resetting said cycle timer and said on timer.

7. An automatic reset pneumatic timer in accordance with claim 6 including a second manual reset valve connected with said on timer for resetting said on timer independently of said cycle timer.

8. An automatic reset pneumatic timer for communicating pressure signals to a motor valve comprising: a pressure source line; a cycle timer having a pneumatic valve connected with said pressure source line for communicating a first pressure signal for a first predetermined period of time from said pressure source and interrupting said signal at the termination of said first period of time; an on timer having a pneumatic valve connected with said cycle timer for operating responsive to said cycle timer to communicate a second pressure signal for a second shorter predetermined period of time; said timers each having starting means and means for moving said pneumatic valve connected thereto to a first pressure signal discharge position responsive to initiating a pressure supply to said timer, means for moving said pneumatic valve to a second position closing said pressure signal exhaust responsive to timing out, and means for reset responsive to interrupting said pressure supply to said timer; a relay valve connected with said on timer for receiving said second pressure signal and operating said relay valve responsive to said signal; a pressure signal delivery line connected from said pressure source line through said relay valve for delivering a third pressure signal controlled by said cycle timer and said on timer to said motor valve; and an automatic cycle reset valve connected with said cycle timer and with said on timer for interrupting pressure to said timers for resetting both said cycle timer and said on timer responsive to timing out of said cycle timer.

9. An automatic reset pneumatic timer in accordance with claim 8 including a manual cycle reset valve connected with said automatic cycle reset valve for manually resetting both said cycle timer and said on timer.

10. An automatic reset pneumatic timer in accordance with claim 9 including a manual reset valve connected with said on timer for manually resetting said on timer independently of said cycle timer.

11. An automatic reset pneumatic timer in accordance with claim 10 including a shut-off-on-arrival valve connected between said on timer and said relay valve for interrupting a pressure signal from said on timer to said relay valve responsive to a pressure signal applied to said shut-off-on-arrival valve for delivering said pressure signal to said motor valve independently of said on timer.

12. An automatic reset pneumatic timer in accordance with claim 11 including a trip valve connected between said pressure source line and said shut-off-on-arrival valve for operating said shut-off-on-arrival valve responsive to a mechanical signal applied to said trip valve.

13. An automatic reset pneumatic timer in accordance with claim 12 plus a line connecting said automatic reset valve and said shut-off-on-arrival valve for resetting said shut-off-on-arrival valve responsive to operation of said automatic reset valve when said cycle timer and said on timer are reset.

14. An automatic reset pneumatic timer in accordance with claim 13 including a flow control valve connected with said automatic reset valve for bleeding off pilot pressure to said automatic reset valve to provide delay time for reset of said cycle timer and said on timer.

15. An automatic reset pneumatic timer for communicating pressure signals to a motor valve to control the opening and closing of said motor valve comprising: a pressure source line for supplying operating pressure to said pneumatic timer; a cycle timer having a pneumatic valve connected at an inlet port with said pressure source line; an on timer having a pneumatic valve connected at an inlet port with a first outlet port of said cycle timer; said timers each having starting means and means for operating said pneumatic valve connected thereto to open a first outlet port responsive to initiating a pressure supply to said timer, means for operating said pneumatic valve to close said first outlet port and open a second outlet port responsive to timing out, and means for reset responsive to interrupting said pressure supply to said timer; a pneumatic relay valve having an outlet port connectible with said motor valve and an inlet port connected through a pressure regulator with said pressure source line for communicating a control pressure signal from said pneumatic timer to said motor valve responsive to operation of said cycle timer and said on timer; a line connecting a first outlet port of said on timer with a pilot port of said relay valve for opening said relay valve responsive to a pressure signal from said on timer; an automatic reset valve connected at an inlet port with said pressure source line and at an outlet port with a pilot port of said cycle timer and a pilot port of said on timer for supplying operating pressure to said cycle timer and said on timer and for interrupting said operating pressure for reset of said cycle timer and said on timer; a pressure line from a second outlet port of said cycle timer to a pilot port of said automatic reset valve for actuating said automatic reset valve responsive to timing out of said cycle timer; and a flow control valve connected with said pilot port of said automatic reset valve for bleeding pressure from said pilot port to control the rate of operation of said automatic reset valve for permitting reset of said cycle timer and said on timer.

16. An automatic reset pneumatic timer in accordance with claim 15 including a manual reset valve having an inlet port connected with said pressure source line and an outlet port connected through said flow control valve to said pilot port of said automatic reset valve for manually operating said automatic reset to reset said cycle timer and said on timer.

17. An automatic reset pneumatic timer in accordance with claim 16 including a manual reset valve connected between said automatic reset valve and said on timer and having an exhaust port for bleeding pressure from said on timer to reset said on timer independently of said cycle timer.

18. An automatic reset penumatic timer in accordance with claim 15 including a shut-off-on-arrival valve connected between said on timer and said relay valve for interrupting a pressure signal from said on timer to said relay valve to operate said relay valve for bleeding pressure from said motor valve; a pneumatic trip valve operable responsive to a mechanical signal having an inlet port connected with said pressure source line and an outlet port connected with said arrival valve to apply a pressure signal to said arrival valve responsive to said mechanical signal for operating said arrival valve to control said motor valve responsive to said mechanical signal; and a line from said arrival valve to said automatic reset valve for resetting said arrival valve responsive to a pressure signal applied to said automatic reset valve when resetting said cycle timer and said on timer.

19. An automatic reset pneumatic timer in accordance with claim 18 including a manual reset valve having an inlet port connected with said pressure source line and an outlet port connected through said flow control valve to said automatic reset valve for manually operating said automatic reset valve to reset said cycle timer and said on timer.

20. An automatic reset pneumatic timer in accordance with claim 19 including a manual reset valve connected between said automatic reset valve and said on timer for interrupting a pressure signal from said automatic reset valve to said on timer for resetting said on timer independently of said cycle timer.

* * * * *